(12) United States Patent
Mazzer

(10) Patent No.: US 11,419,456 B2
(45) Date of Patent: Aug. 23, 2022

(54) COFFEE GRINDER-DOSER PROVIDED WITH AN AUTOMATIC ACTUATOR FOR REGULATING THE GRINDING GRANULOMETRY AND REGULATING METHOD THEREOF

(71) Applicant: MAZZER LUIGI S.p.A., Venice (IT)

(72) Inventor: Giovanni Mazzer, Venice (IT)

(73) Assignee: MAZZER LUIGI S.P.A., Venice (IT)

( * ) Notice: Subject to any disclaimer, the term of this patent is extended or adjusted under 35 U.S.C. 154(b) by 190 days.

(21) Appl. No.: 16/479,296

(22) PCT Filed: Feb. 22, 2018

(86) PCT No.: PCT/IB2018/051112
§ 371 (c)(1),
(2) Date: Jul. 19, 2019

(87) PCT Pub. No.: WO2018/185570
PCT Pub. Date: Oct. 11, 2018

(65) Prior Publication Data
US 2019/0365155 A1    Dec. 5, 2019

(30) Foreign Application Priority Data

Apr. 6, 2017 (IT) .......................... 102017000038061

(51) Int. Cl.
*A47J 42/18* (2006.01)
*A47J 42/16* (2006.01)
(Continued)

(52) U.S. Cl.
CPC ............... *A47J 42/18* (2013.01); *A47J 42/16* (2013.01); *A47J 42/20* (2013.01); *A47J 42/38* (2013.01); *A47J 31/42* (2013.01)

(58) Field of Classification Search
CPC .. A47J 42/18; A47J 42/16; A47J 42/20; A47J 42/28; A47J 42/50; A47J 31/42
See application file for complete search history.

(56) References Cited

U.S. PATENT DOCUMENTS

| 4,605,175 A | 8/1986 | Weber |
| 5,211,344 A | 5/1993 | In Albon |

(Continued)

FOREIGN PATENT DOCUMENTS

| CN | 102813468 A | 12/2012 |
| CN | 105615653 A | 6/2016 |

(Continued)

OTHER PUBLICATIONS

International Search Report for corresponding application PCT/IB2018/051111 filed Feb. 22, 2018; dated Apr. 16, 2018.

(Continued)

*Primary Examiner* — Faye Francis
(74) *Attorney, Agent, or Firm* — Cantor Colburn LLP

(57) ABSTRACT

A coffee grinder-doser including a grinder-doser body, an electric motor, at least one driven grinder operatively connected to the electric motor, at least one fixed grinder, operatively separate from the electric motor, the driven and fixed grinders having respective teeth mutually facing and spaced from each other with respect to an adjustment direction X-X, where at least one out of the driven and fixed grinders is movable with respect to the other along the adjustment direction X-X, where the grinder-doser includes an automatic actuator operatively connected by transmission means to the driven grinder and/or fixed grinder so as to adjust and modify the mutual distance between the teeth thereof along the adjustment direction X-X.

20 Claims, 9 Drawing Sheets

(51) Int. Cl.
  *A47J 42/20* (2006.01)
  *A47J 42/38* (2006.01)
  *A47J 31/42* (2006.01)

(56) References Cited

U.S. PATENT DOCUMENTS

| | | | |
|---|---|---|---|
| 5,386,944 A | 2/1995 | Knepler | |
| 8,181,894 B2* | 5/2012 | Majer | A47J 42/18 |
| | | | 241/30 |
| 8,272,586 B2* | 9/2012 | Bolognesi | A47J 31/42 |
| | | | 241/36 |
| 2005/0077403 A1* | 4/2005 | Yang | A47J 42/06 |
| | | | 241/100 |
| 2010/0095852 A1* | 4/2010 | Remo | A47J 31/3614 |
| | | | 99/280 |
| 2010/0170971 A1* | 7/2010 | Doglioni Majer | A47J 42/38 |
| | | | 241/30 |
| 2016/0120366 A1 | 5/2016 | Mazzer | |
| 2016/0143481 A1 | 5/2016 | Merelli | |
| 2016/0256001 A1 | 9/2016 | Lehotay | |
| 2018/0055288 A1* | 3/2018 | Rose | A47J 42/38 |

FOREIGN PATENT DOCUMENTS

| | | |
|---|---|---|
| CN | 106136912 A | 11/2016 |
| CN | 106175489 A | 12/2016 |
| EP | 1994866 A1 | 11/2008 |
| EP | 2286699 A1 | 2/2011 |
| EP | 3023041 A1 | 5/2016 |
| WO | 2012138327 A1 | 10/2012 |
| WO | 2014206944 A1 | 12/2014 |
| WO | 2015006244 A1 | 1/2015 |

OTHER PUBLICATIONS

International Search Report for corresponding application PCT/IB2018/051112 filed Feb. 22, 2018; dated Apr. 24, 2018.
Written Opinion of the International Searching Authority for corresponding application PCT/IB2018/051111 filed Feb. 22, 2018; dated Apr. 16, 2018.
Written Opinion of the International Searching Authority for corresponding application PCT/IB2018/051112 filed Feb. 22, 2018; dated Apr. 24, 2018.
Chinese Office Action for corresponding application 2018800103184; Report dated Oct. 19, 2021.

* cited by examiner

COFFEE GRINDER-DOSER PROVIDED WITH AN AUTOMATIC ACTUATOR FOR REGULATING THE GRINDING GRANULOMETRY AND REGULATING METHOD THEREOF

FIELD OF APPLICATION

The present invention relates to a coffee grinder-doser with automatic regulation of the grinding granulometry and related regulating method.

PRIOR ART

As is known, there are grinder-dosers for espresso preparations. Grinder-dosers for preparations other than espresso also known such as, for example, coffee grinder-dosers for Turkish coffee or American coffee.

These coffee-based preparations require different grinding granulometries to optimise the specific brewing technique used to extract coffee for the preparation of the beverage.

In particular, the granulometry has a progressively increasing average particle value passing from Turkish grinding, to espresso, or to American coffee (also called filter).

However, there are many other preparations known on the market which require intermediate granulometries between those mentioned above.

There is also the need to offer the user a high degree of accuracy in the research of the granulometry of ground coffee around the degree of granulometry typical for the specific coffee-based preparation.

In a coffee grinder that uses grindstones as a crushing tool, the different profiles of granulometric distribution of the coffee powder for the different types of preparations are obtained by acting on the relative distance between the grinders between which the bean is transformed into powder.

The smaller the relative displacement between the grinders, the greater the degree of accuracy with which a determined and optimal granulometric profile of the coffee powder is defined, in order to enhance the organoleptic properties of the beverage extracted with the specific selected infusion/extraction method.

At least one of the grinders is driven and set in rotation by an electric motor. The grinders are housed inside a grinding chamber. The grinders in turn are supported and kept appropriately oriented by relative grinder holders in order to provide an annular outlet section between the grinders that is constant over the entire perimeter thereof, to have a homogeneous distribution of the powder at each outlet point from the grinders. It is therefore understood that the grinders are coaxial with each other.

The driven grinder is coupled to the transmission axis of the motor by means of the relative grinder holder, and it is put in rotation by the electric motor. The adjustment of the distance between the grinders is carried out by moving at least one of the grinders, which in turn is coupled to its holder, placing it in axial movement (i.e. by bringing it closer or further away from the other grinder) and this is commonly done by a screw/nut screw coupling.

Systems are known which to search for the relative position between the grinders move either the driven grinder or the grinder not driven by the electric motor.

An adjustment that contemplates a 360° rotation on the thread that generates the movement of the grinders generates an approach or removal between the grinders by a distance equal to the threading step.

To make the relative positioning between the grinders very accurate, acting directly on the thread of the screw/nut screw, the thread should have a very small pitch (in this way, with the same angle of rotation, less relative movement is obtained between the grinders) but, on the other hand, the thread would be less robust and less resistant.

Alternatively, it is possible to act with a transmission with an appropriate transmission ratio towards the screw/nut screw system, so as to have through this transmission an acceptable accuracy of the position around the desired granulometry adjustment point.

It is clear, however, that in order to obtain granulometry distributions suitable for different extraction/infusion methods, very large displacements would be required by means of the above transmission, which would contemplate multiples of 360° of rotation of said thread, with long and non-ergonomic operations for the operator.

Furthermore, it is important to bear in mind that when the starting material changes (different origins of the ground coffee, any mixture combinations thereof, different toasting profiles to which it has been subjected, seasoning of the package, and many other factors), the optimal distance at which to place the grinders to obtain the maximum yield in the selected infusion/extraction technique also changes.

There are also diffused situations in which there is the need to select different starting raw materials in the same grinder-doser which in turn can be extracted with different extraction/infusion methods. For example, think of a café.

Normally these adjustments are made with external transmission of said screw/nut screw system, through which the operator commonly acts manually.

Therefore, if the operator needs to use in sequence different types of coffee, different extraction systems or a combination of the same, the degree of usability of the grinder-doser would be heavily affected, thereby making it less ergonomic, with the risk of confusing the adjustment positions and wasting raw material for the non-optimal result in the infusion/extraction.

There is therefore a real difficulty in implementing a grinder-doser which can be used for many types of coffee-based preparations, and with a grinding regulation system which is very accurate in the vicinity of regulation intervals which have very different relative distances between the grinders.

DISCLOSURE OF THE INVENTION

The need of solving the drawbacks and limitations mentioned with reference to the prior art is therefore felt.

Such a need is met by a grinder-doser according to claim 1 and by an adjustment method according to claim 17.

DESCRIPTION OF THE DRAWINGS

Further features and advantages of the present invention will appear more clearly from the following description of preferred non-limiting embodiments thereof, in which.

Elements or parts of elements in common to the embodiments described below are referred to with the same reference numerals.

DETAILED DESCRIPTION

Figure 1:
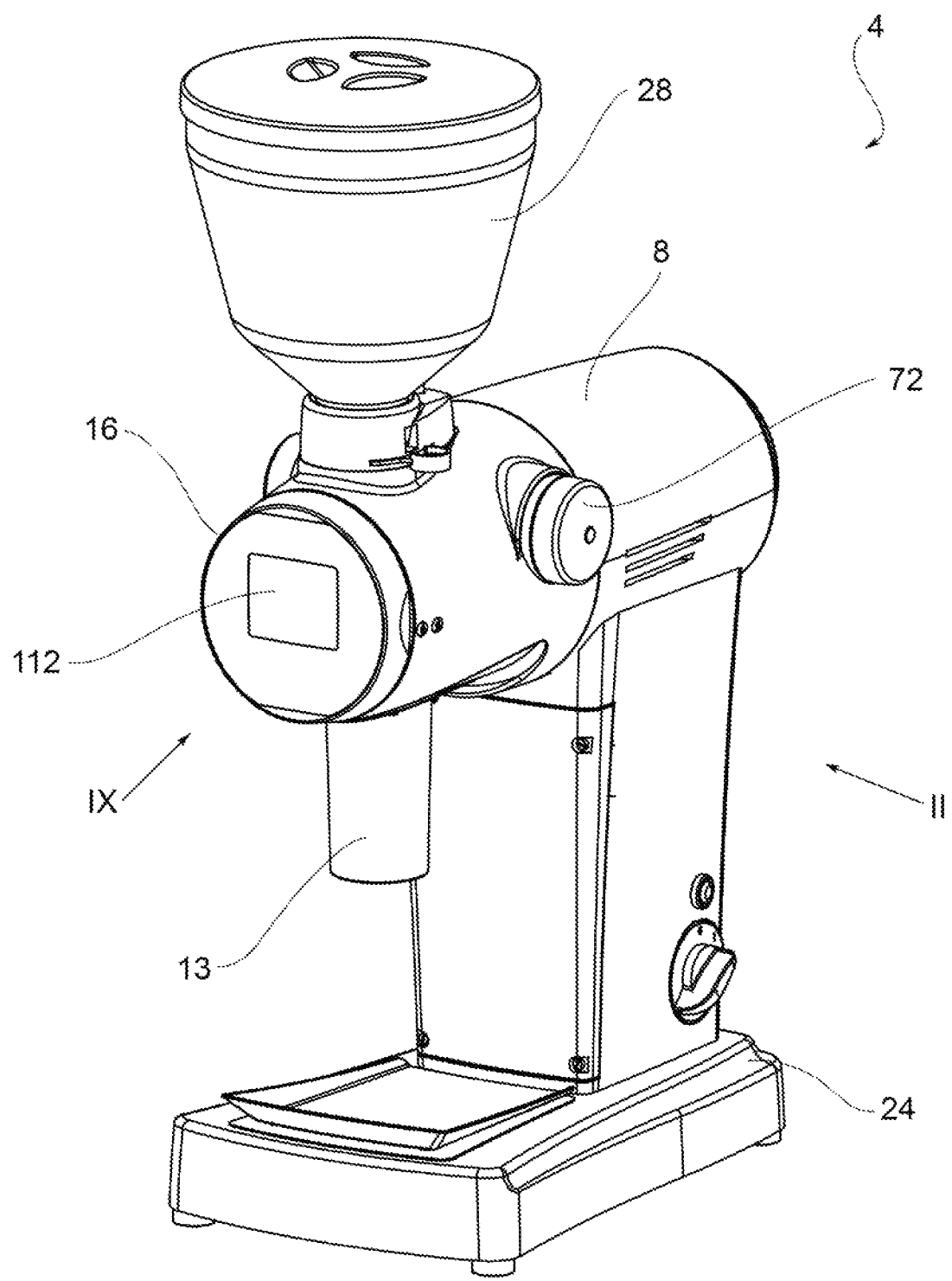
FIG. 1 shows a perspective view of a coffee grinder-doser according to an embodiment of the present invention.
Figure 2:
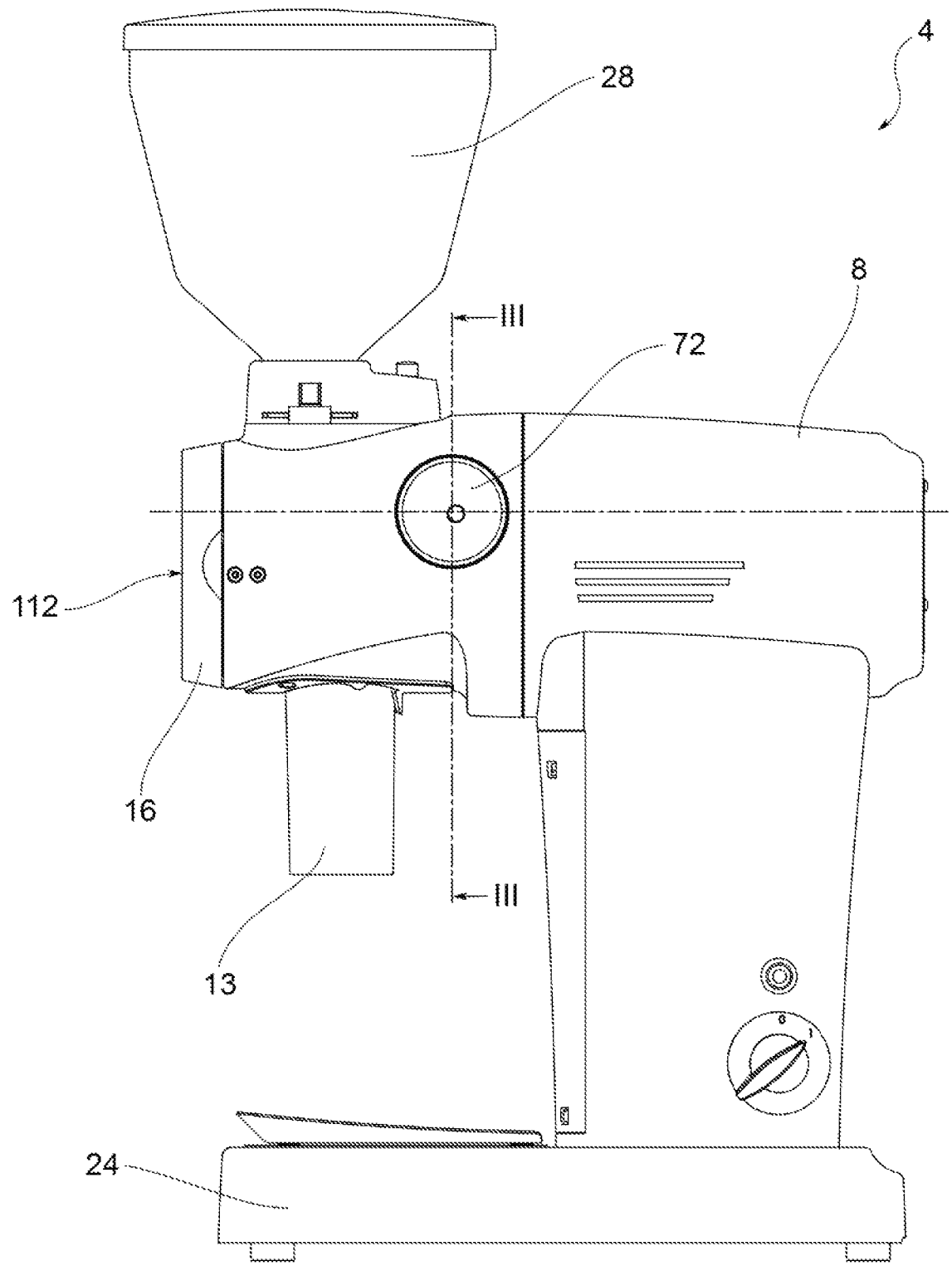
FIG. 2 shows a lateral view of the coffee grinder-doser in FIG. 1 from the side of arrow II in FIG. 1.
Figure 3:
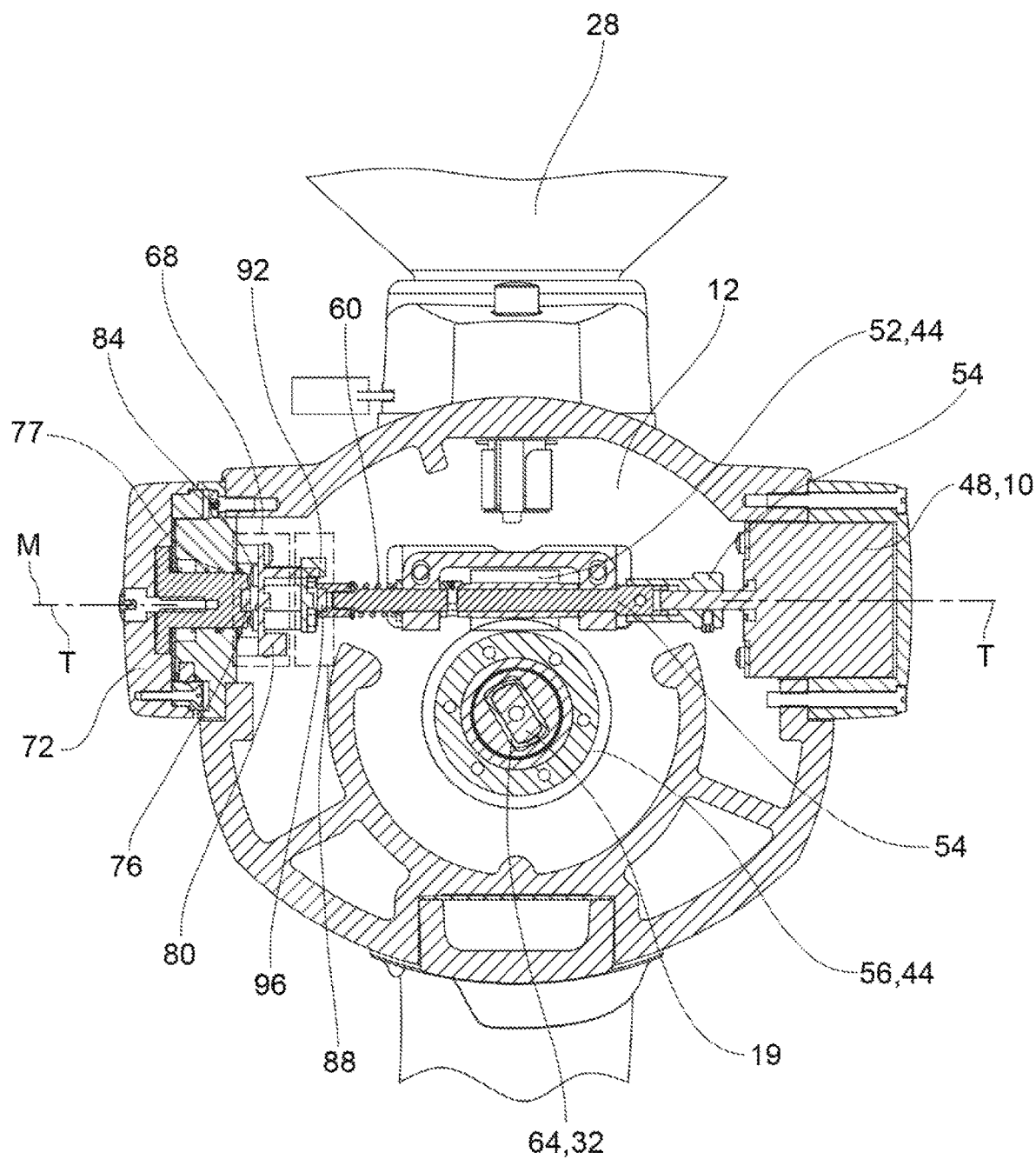
FIG. 3 shows a sectional view of the grinder-doser in FIG. 1, along the section plane III-III in FIG. 2.
Figure 4:
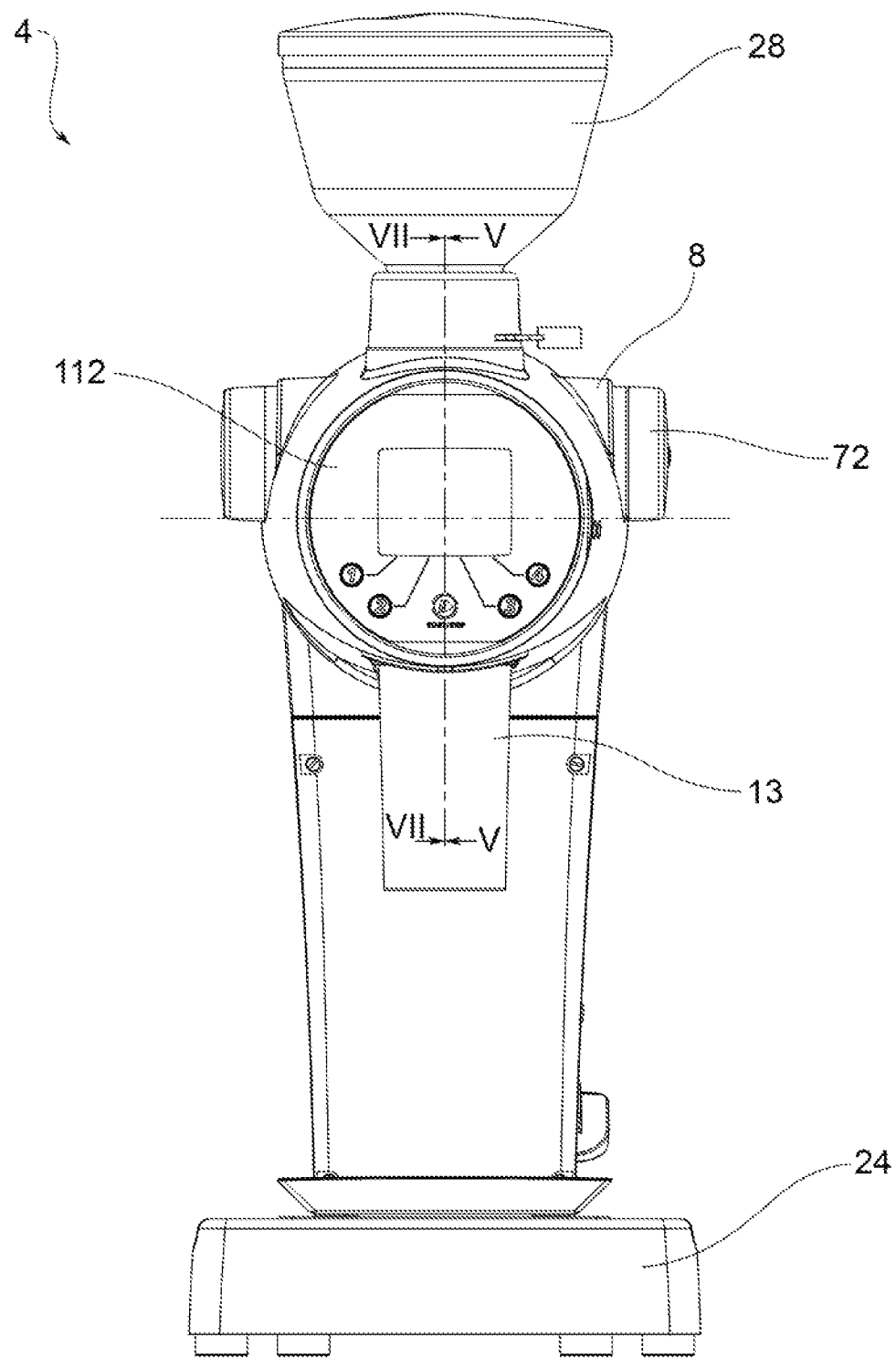
FIG. 4 shows a front view of the grinder-doser in FIG. 1.

With reference to the above figures, reference numeral 4 globally indicates an overall schematic view of a grinder-doser according to the present invention.

The coffee grinder-doser 4 comprises one grinder-doser body 8 which delimits at least one containing compartment 12 and is for example provided with a front cover 16.

The grinder-doser body further comprises an electric motor 18, at least one driven grinder 20 operatively connected to said electric motor 18 and at least one fixed grinder 22, operatively separate from the electric motor 18.

In other words, the driven grinder 20 is rotated by the electric motor 18 to which it is connected by a joint 32, while the fixed grinder 22 does not rotate. Preferably, said joint 32 is an overhead joint between a drive shaft 19 of the electric motor 18 and the driven grinder 20.

The drive shaft 19 also supports a cooling fan 29 which rotates integrally therewith.

For the purposes of the present invention, the axis of orientation of the electric motor is irrelevant: therefore, it can be either horizontal or vertical.

The grinder-doser body 8 further comprises a base 24 and a bell 28 for containing coffee beans. The bell 28, in a known manner, conveys the coffee beans towards said driven 20 and fixed 22 grinders so as to obtain coffee in powder form.

The fixed and driven grinders 20, 22 are housed inside a grinding chamber 23.

Figure 5:
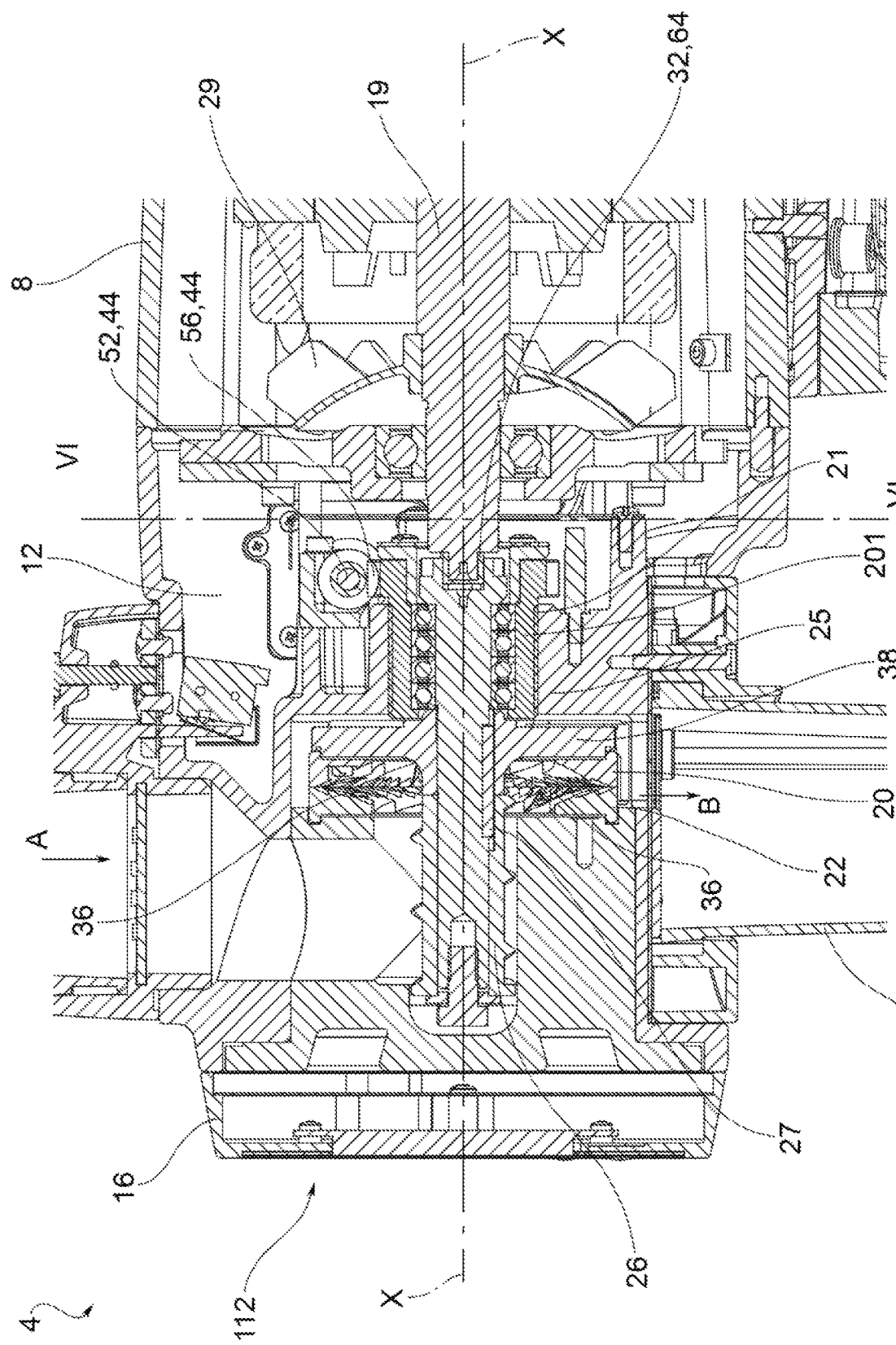
FIG. 5 shows a sectional view of the grinder-doser in FIG. 1, along the section plane V-V in FIG. 4, in a configuration of minimum distance between the grinders.
Figure 7:
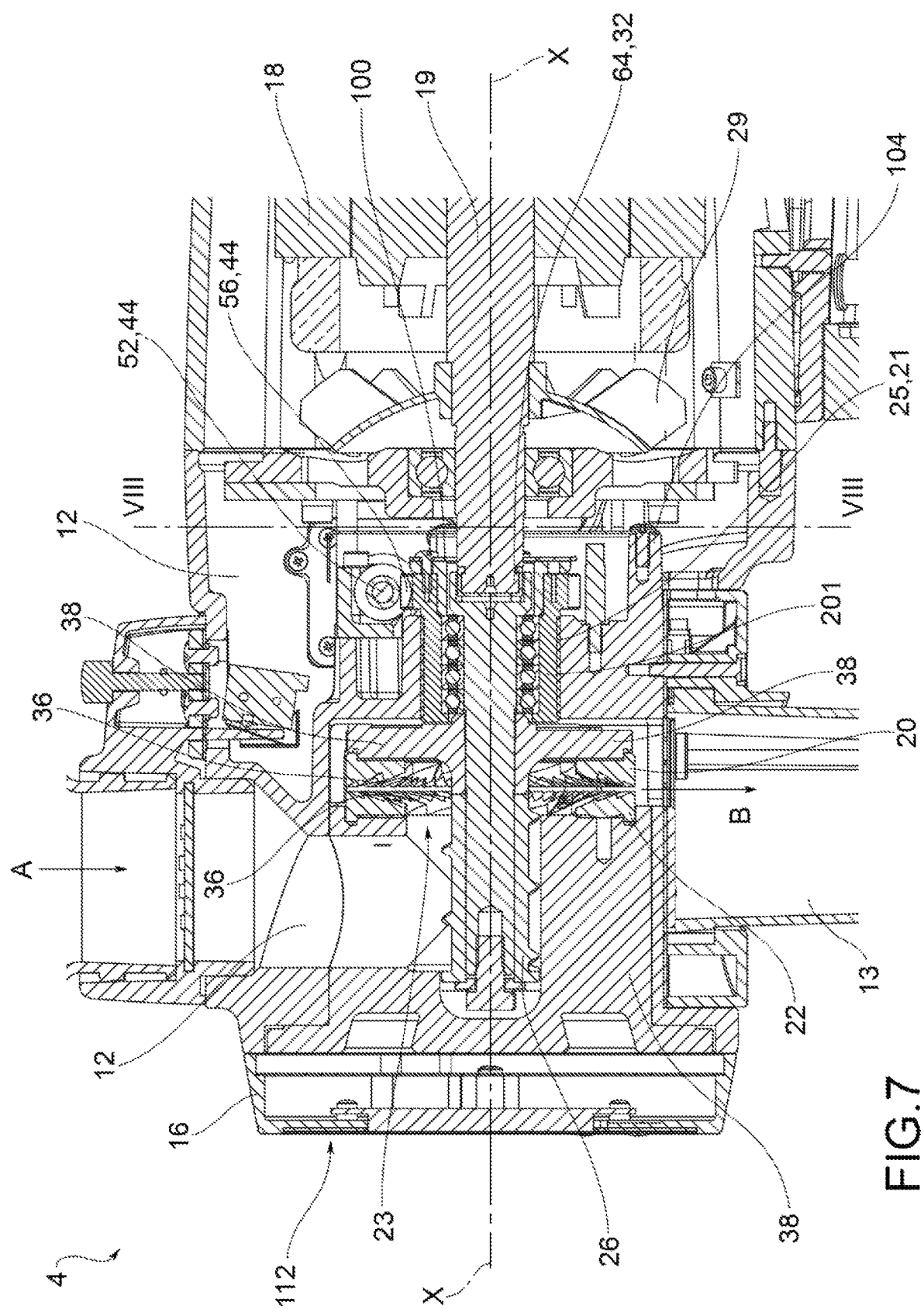
FIG. 7 shows a sectional view of the grinder-doser in FIG. 1, along the section plane VII-VII in FIG. 4, in a configuration of maximum distance between the grinders.

The coffee beans enter from above, arrow A, and come out of the grinding chamber 23 in the form of powder, arrow B, in FIGS. 5 and 7. For example, the coffee powder is conveyed into a glass or outlet pipe 13.

The beans are pushed towards the grinders 20, 22 by an auger 26 placed inside the grinding chamber 23.

For example, the auger 26 is moved in rotation by the driven grinder 20 to which it is connected in rotation, for example by the interposition of a key 27.

The specific geometry of the grinders 20, 22 is not significant for the purposes of the invention (which are commonly referred to as conical grinders or flat grinders, depending on the coupling generatrix between them).

Said driven 20 and fixed 22 grinders are provided with respective teeth 36 mutually facing and spaced from each other with respect to an adjustment direction X-X.

The driven and fixed grinders 20, 22 may be integral or, preferably, may comprise the teeth 36 and a relative grinder holder plate or disc 38. For the purposes of the present invention, the presence of the grinder holder plate or disc 38 is not essential; in the following description, reference will generally be made to the fixed or driven grinders 22, 20 without specifying the possible presence or absence (completely optional) of the grinder holder 38.

The teeth 36 may have various geometries and are shaped so as to grind the coffee beans.

At least one out of said driven 20 and fixed 22 grinders is movable with respect to the other along said adjustment direction X-X.

For example, in the configuration shown, the movable grinder is the grinder rotated by the electric motor 18. The electric motor 18 drives the driven grinder 20 in rotation by means of mechanical transmissions; these transmissions allow in a separate way the drive in rotation of the grinder (due to the electric motor 18) from the axial displacement along axis x-x implemented by means of a screw 201 placed in axial contact with the grinder, but released from the drive in rotation. The screw 201 is provided with an outer thread 21, which wraps around said adjustment direction X-X and which engages in a fixed nut screw 25: in this way, the rotation of the driven grinder 20 also causes the translation thereof along the adjustment direction X-X.

The translation of the driven grinder 20 is equal to a pitch of the screw 201 following a rotation of 360 degrees, i.e. a complete revolution.

Of course, it is also possible to move the fixed grinder 22 with a completely similar mechanism.

By adjusting the relative position between the driven and fixed grinder 20, 22, the distance between the respective teeth 36 and therefore the granulometry of obtainable coffee powder can be modified.

Advantageously, the grinder-doser 4 comprises an automatic actuator 40 operatively connected by transmission means 44 to the driven grinder 20 and/or fixed grinder 22 so as to adjust and modify the mutual distance between the teeth 36 thereof along said adjustment direction X-X.

According to an embodiment, said automatic actuator 40 comprises a stepper motor 48.

According to claim an embodiment, the transmission means 44 comprise a worm or pinion 52 and a toothed wheel 56 meshed with said worm 52.

For example, the worm or pinion 52 is integral in rotation with said automatic actuator 40, typically a stepper motor 48, and the toothed wheel 56 is integral with the screw 201 which moves one between the driven grinder 20 and the fixed grinder 22.

The worm or pinion 52 is directed along a transverse direction T-T, preferably perpendicular to the adjustment direction X-X.

Preferably, the stepper motor 48 is arranged along the same transverse direction T-T so as to have a head connection with the worm or pinion 52 through a front joint 54.

The toothed wheel 56 is directed along a rotation axis parallel and preferably coaxial with the adjustment direction X-X.

Thus, the worm or pinion 52 and the toothed wheel 56, which engage with each other, are directed along mutually perpendicular and offset axes, respectively identified by the transverse direction T-T and by the adjustment direction X-X.

Preferably, between the worm or pinion 52 and the toothed wheel 56 elastic clearance recovery means 60 are placed, to ensure the contact without clearance between the worm or pinion 52 and teeth of the toothed wheel 56.

The absence of clearance is important to always ensure the achievement of the correct relative distance between the driven and fixed grinders 20, 22, above all following the inversions of the rotation motion of the stepper motor 48.

Preferably, as seen, the worm or pinion 52 is coaxial to the automatic actuator 40 and perpendicular to a rotation axis of the driven grinder 20, which is in turn parallel to the adjustment direction X-X.

Preferably, the mechanical connection between the electric motor 18 and the driven grinder 20 comprises a grooved profile 64 so as to enable the transmission of rotation and a relative translation between them.

In other words, the joint 32 is formed by a grooved profile 64; the grooved profile 64 allows obtaining a relative translation between the drive axis 19 of the electric motor 18 and the driven grinder 20, to carry out the adjustment of the relative position between the grinders 20, 22, while ensuring the connection in rotation between the drive axis 19 and the driven grinder 20.

According to an embodiment, the grinder-doser 4 comprises a first encoder 68 integral in rotation with an adjustment knob 72 outside the grinder-doser body 8. The adjustment knob rotates around its own axis of rotation M-M. Preferably, but not necessarily, said axis of rotation M-M is parallel and coaxial to the transverse direction T-T of the worm or pinion 52.

For example, the first encoder 68 comprises a first magnet 76 having a diametrically oriented magnetic field, and a relative first electronic circuit board 80 interfaced with the first magnet 76 provided with sensors such as to read the orientation of the first magnet 76 and recognise the degree of rotation the knob itself has undergone.

According to an embodiment, the adjustment knob 72 is movable axially with respect to the grinder-doser body 8, along a direction parallel to the axis of rotation M-M.

For example, the first electronic circuit board 80 comprises a proximity sensor 84 which also recognises the approach in axial direction (parallel to the axis of rotation M-M) of the first magnet 76 integral with the adjustment knob 72. In this regard, it is possible to insert return springs 77 which oppose said approach movement of the adjustment knob 72.

According to an embodiment, the grinder-doser 4 comprises a second encoder 88 integral in rotation with the worm or pinion 52, provided with a relative second control electronic circuit board 92 of the second encoder 88.

For example, the second encoder 88 associated with the worm or pinion 52 comprises a second magnet 96 having a diametrically oriented magnetic field, arranged integrally with a guide axis of the worm or pinion 52 and therefore also with the automatic actuator 40.

The orientation of the second encoder 88 is detected by a sensor on the second control electronic circuit board 92 of the second encoder 88 facing it.

The second encoder 88, preferably, axially faces the first encoder 68.

According to an embodiment, a limit stop disc 100 fitted with an appendage 102 is fixed to the toothed wheel 56 so as to interfere in abutment with a locking pin 104 integral with the grinder-doser body 8, so as to identify a 360° limit stop to the rotation of the driven grinder wheel 20.

The limit stop disc 100 is preferably provided with at least one slot 106 for the passage of a fixing screw 108 of the limit stop disc 100 on the toothed wheel 56, to record the angular position of the limit stop 100 and the relative appendage 102.

The operation of a grinder-doser according to the present invention shall now be described.

As regards the operation of the grinder-doser 4, it is managed by a processing and control unit which supervises the operation of the electric motor 18, of the automatic actuator 40, and of the encoders 68, 88.

Preferably, this operation is displayed on a display 112 which displays a series of information about the operating parameters and the positioning of the grinders. Preferably, the display 112 also comprises a plurality of keys 116 which allow setting the adjustments on the granulometry of the coffee powder to be obtained.

As seen, in order to adjust the relative position between the fixed and driven grinders so as to obtain the predetermined granulometry for the coffee powder, the driven grinder 20 must allow, through its grinder holder plate or disc 38, an axial movement of removal/approach of the grinders 20, 22, mechanically separate from the drive operated by the electric motor 18. This decoupling is achieved by means of a coupling with a grooved profile with the drive shaft or axis 19.

That said, it is also necessary to provide an electro/mechanical and logic routine, with which to carry out a setting of the grinder-doser 4 so that the contact point of the driven and fixed grinders 22 is known.

It is to be noted that the encoders 68, 88, connected to the control system of the device, detect and record in real time the movements of the respective connected elements.

For example, one starts with the definition of a closing zeroing point, i.e. the zeroing corresponding to the minimum opening or distance between the grinders 20, 22.

For example, with the electric motor 18 off, with grinding chamber 23 and gap between the grinders 20, 22 free of coffee (for example with a new appliance, after a change of the grinders, after a cleaning of the grinding chamber 23), with indefinite motion by actuating the stepper motor 48 in a given and known direction of rotation.

When the grinders 20, 22 touch each other, the stepper motor 48 operates with a locked rotor (detectable by the control system with an electrical absorber check) and/or the second encoder 88 of the worm or pinion 52 reads that the movement is not proceeding: in this case, it recognises that the grinders 20, 22 have come into contact with each other.

The system now recognises from this zero position the relative displacement at the opening of the grinders 20, 22 and, since the dimensional construction of the mechanical transmission is known, it can show on the display 112 the actual measurement of the relative distance between the grinders 20, 22 in the desired unit of measurement (mm, inch).

For safety reasons and to avoid damage to the grinding system, it is preferable, at software level, to set a minimum offset below which it will not be possible in normal use to approach the grinders 20, 22.

If the contact position of the grinders 20, 22 has not been determined, the system does not allow the appliance to control the grinding or to position itself (since it does not know an absolute measurement to refer to).

The offset is defined in such a way that there are no coffee-based preparation types that require granulometries with a grinding degree lower than that obtainable below said offset.

At rest, the display 112 shows the current relative position of the grinders 20, 22 (as said in absolute measurement in the selected measuring system).

By acting on the adjustment knob 72 and in combination with the key 116 and the display 112, the new position is selected and the repositioning is controlled, which is now automated.

This operation of selecting the new position can be carried out using only the adjustment knob 72 and using as a confirmation key the axial movement of the adjustment knob 72 along the axis M-M through the proximity sensor 84 to read the pulse operated on the adjustment knob 72.

The system, again by means of adjustment knob 72 and display 112, is able to store an indefinite multitude of adjustment positions, associating them with a name that identifies the raw material and/or the combined infusion/extraction system.

It is possible to recall the desired position from a saving memory and to command the repositioning of the grinders thereon.

It is also possible to have on the display 112 or on a keypad associated therewith, a discrete number of keys 116 to which, again by means of the adjustment knob 72 and the display 112, a limited number of positions can be combined.

This allows a recall and relative positioning of the grinders in faster times, to the advantage of the barman.

It is also possible to set a maximum opening point, that is, the maximum distance and therefore the maximum granulometry obtainable between the grinders 20,22.

This option is very useful in the configuration in which the driven grinder 20 is also the grinder which determines the relative position between the two grinders 20, 22 as it prevents an excessive stroke from bringing a potentially movable part (grinder holder 38 of the grinders 20, 22 driven in rotation by the electric motor 18) in contact with a fixed part (grinding chamber 23).

This setting function of the maximum opening point can also be performed with coffee between the grinders 20, 22 or inside the grinding chamber 23, since the coffee does not create an obstacle or torque resistant to the stepper motor in relative displacement between the driven and fixed grinders 20, 22.

It is necessary to define an embodiment which contemplates a pitch of the nut screw 25 such that all the granulometries for the preparation of coffee-based beverages can be obtained with a rotation angle of the screw 201 smaller than 360° (contained within a thread pitch).

During assembly at the factory, the grinder holder of the driven grinder 20 integral with the screw 201 is manually placed in contact with the grinding chamber 23 (acting on the axis of the worm or pinion).

Figure 6:
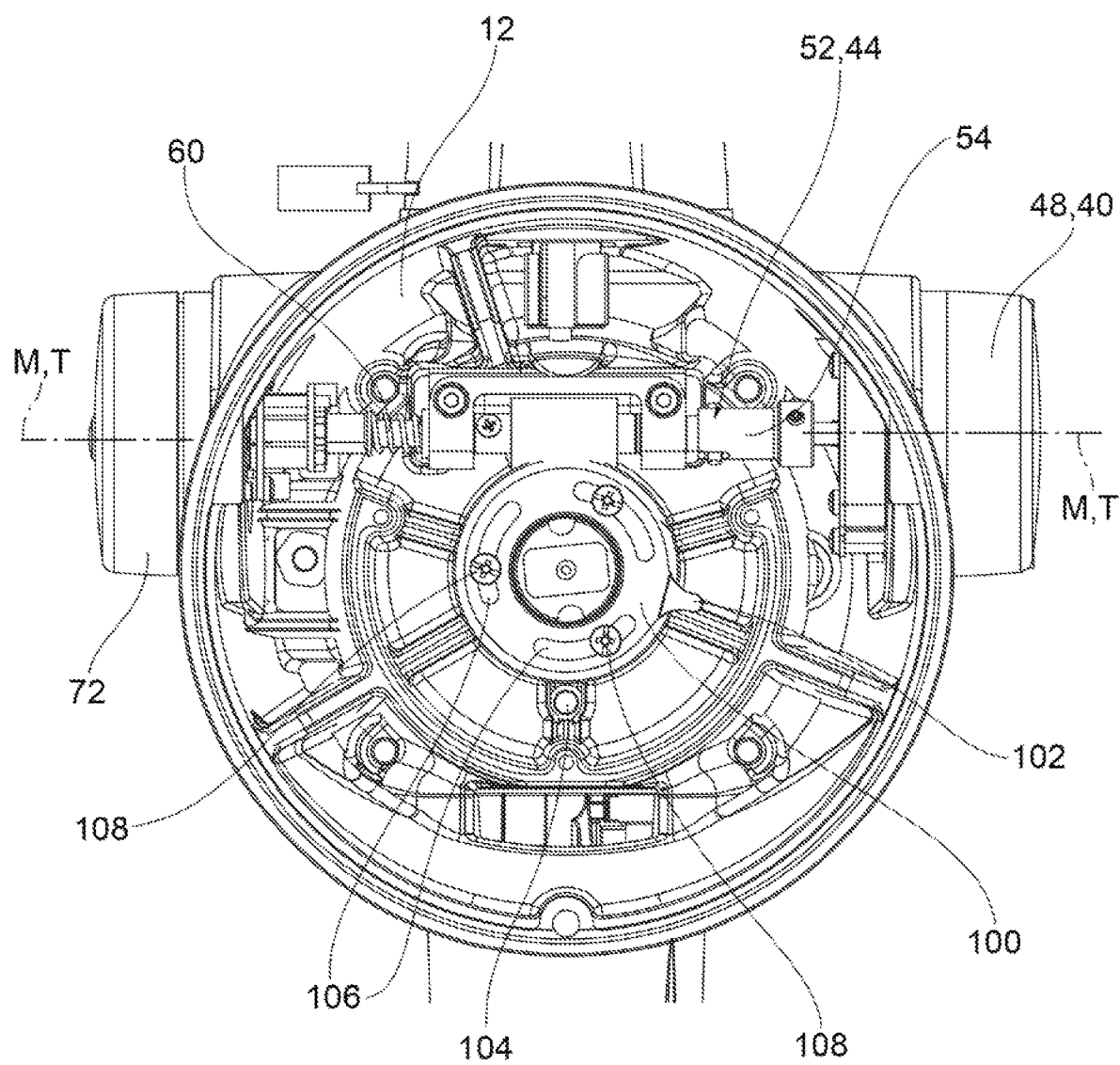
FIG. 6 shows a sectional view of the grinder-doser in FIG. 1, along the section plane IV-IV in FIG. 5, in a configuration of minimum distance between the grinders.
Figure 8:
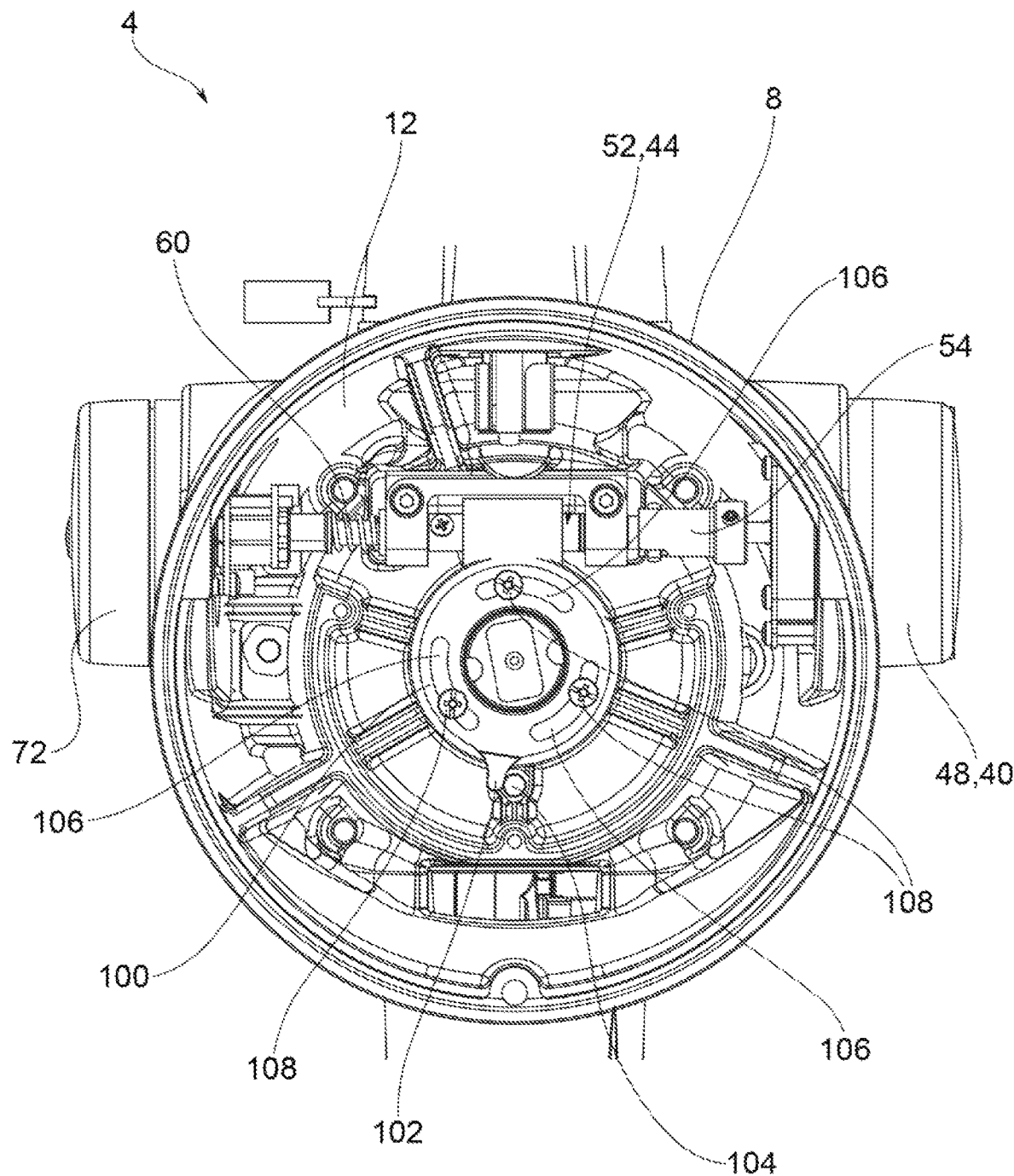
FIG. 8 shows a sectional view of the grinder-doser in FIG. 1, along the section plane VIII-VIII in FIG. 7, in a configuration of maximum distance between the grinders.
Figure 9:
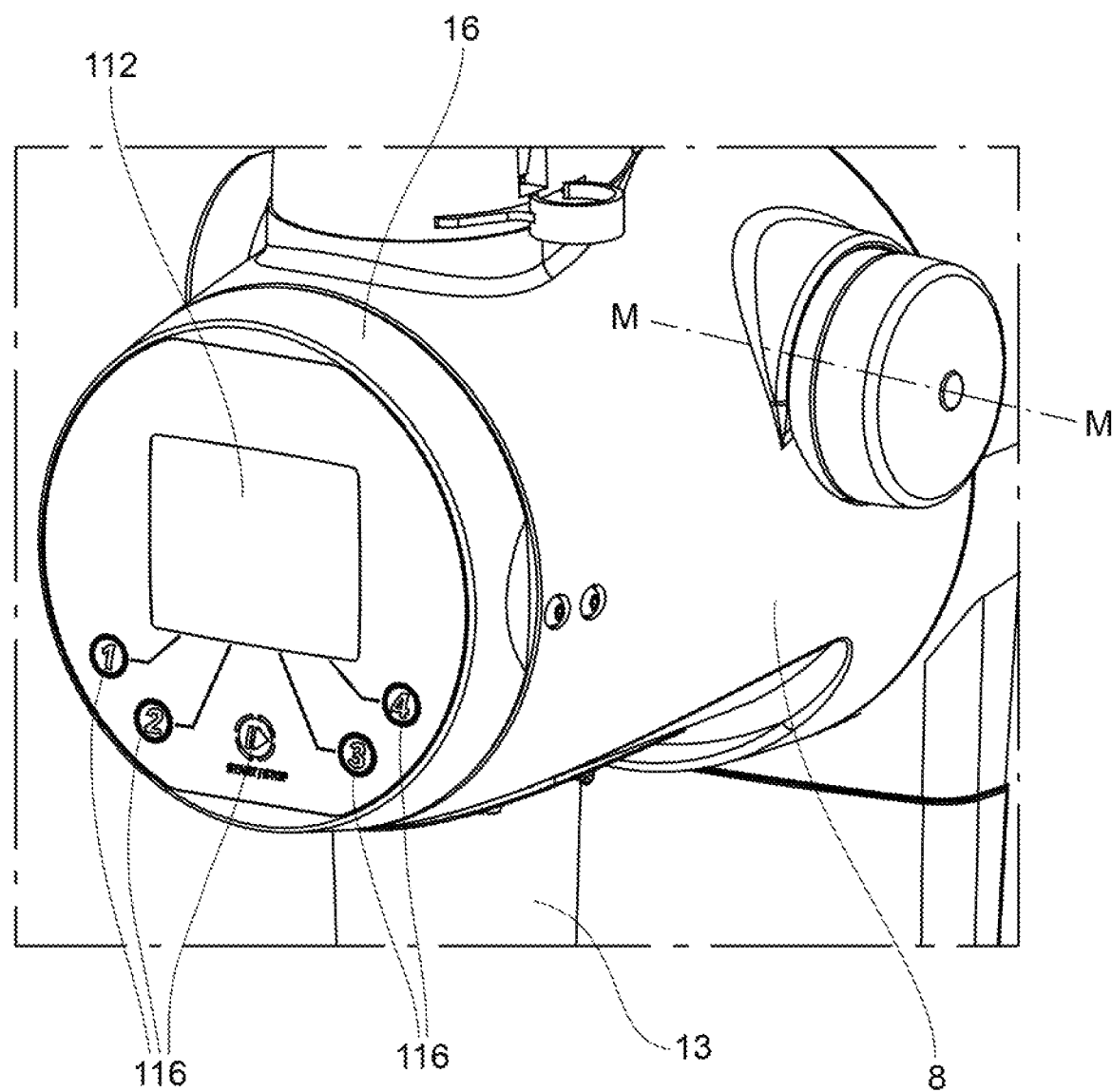
FIG. 9 shows a perspective view of the enlarged detail IX of the grinder-doser in FIG. 1.

From this position, the grinder holder and the grinding chambers are distanced by a certain gap (intended as a safety contact space—FIG. 7).

in this position, the limit stop disc is attached to the screw 201 so that the appendage 102 of said limit stop disc 100 abuts with the locking pin 104 which is integral with the grinder-doser body 8 (FIG. 8). To this end, the slots 106 provided on said limit stop disc 100 are useful (FIGS. 6 and 8).

With the arrangement of the opening limit stop it is possible to program an automatic procedure to reset the grinders 20, 22 that at the first use, or when the grinders are changed (with the prescription of not having coffee inside the grinding chamber 23 or between the grinders 20, 22) allows, with electric motor 18 off, controlling the coffee grinder 4 to determine the contact position of the grinders 20, 22 and a position of maximum opening, exploiting for both the features of the encoders 68, 88 and of the stepper motor 48.

The display 112 will therefore display the maximum opening or closing point and it will not be possible to select positions of the grinders 20, 22 in which to position outside said range.

The control system has an internal memory which stores the relative absolute position read by the second encoder 88 integral with the worm or pinion 52 (position referred to the grinders 20, 22 in contact) after each repositioning.

This allows the last positioning to be retained in memory even after interrupting and resuming the supply of the grinder-doser 4.

If, during a movement, the power supply is interrupted, the stepper motor 48 does not know the position in which it is within the adjustment range, since the new position is saved only at the end of the displacement cycle of the grinders 20, 22.

After such an accidental event, when the grinder-doser is restarted, the limit stop which determines the maximum opening (to which a well-defined absolute distance is associated) allows, even with coffee between the grinders 20, 22, creating a repositioning routine to the last position stored; the system automatically controls the opening of the grinders 20, 22, moving to total opening (therefore without having to empty the grinding chamber 23 and/or freeing the grinders 20, 22 from the coffee present, avoiding waste of raw material) and once the absolute real value is associated with said position, it reposition itself to the last saved position.

As can be appreciated from the description, the grinder-doser according to the present invention allows overcoming the drawbacks of the prior art.

In particular, due to the motor means it is possible to change settings continuously without being forced to intervene manually on the knob and without being forced to long and not very ergonomic manoeuvres.

The system always ensures the correct positioning of the grinders and avoids human error.

The solution of the present invention provides to use, for the adjustment of the grinding point, a worm or pinion-toothed wheel coupling, wherein, preferably, the toothed wheel is integral with the axial support system of one of the grinders and the adjustment is performed by rotating the worm or pinion. The system with worm or pinion and toothed wheel is the one that allows, with the same angular displacement of the control, the most accurate relative positioning between the grinders due to the high transmission ratio.

Due to the high accuracy of the worm or pinion/toothed wheel transmission system, to ensure that a certain position of the adjustment is maintained in the inversion of the direction of rotation of the worm or pinion, elastic means (typically a coil spring) are provided, as seen, which have the function of recovering the coupling clearance between worm or pinion and toothed wheel.

Moreover, the high transmission ratio that allows multiplying the displacements with worm or pinion does not constrain to implement the thread of the screw/nut screw with a fine pitch: in this way, it is possible to use a pitch that allows a strength and a longer life span (e.g. greater resistance to wear).

The knob placed outside the grinder-doser body similarly reproduces the external transmission with manual control of the screw/nut screw coupling of traditional grinder-dosers: actually, as seen, said knob constitutes a non-mechanical but logical system.

This would allow the operator to perform an instinctively simple action similar to that done with the prior art solutions, but which allows less ergonomic effort, and a better and simpler search of the grinding point previously identified also after different intermediate preparations.

A man skilled in the art may make several changes and adjustments to the grinder-dosers described above in order to meet specific and incidental needs, all falling within the scope of protection defined in the following claims.

The invention claimed is:

1. Coffee grinder comprising:
   a grinder body,
   an electric motor,
   at least one driven grinder operatively connected to said electric motor,
   at least one fixed grinder, operatively separate from the electric motor,
   said driven and fixed grinders having respective teeth mutually facing and spaced from each other with respect to an adjustment direction,
   wherein at least one of said driven and fixed grinders is movable with respect to the other along said adjustment direction,
   wherein the coffee grinder further comprises:
   an actuator operatively connected by transmission means to the driven grinder so as to adjust and modify a mutual distance between the teeth thereof along said adjustment direction; and
   a first encoder integral in rotation with an adjustment knob outside the grinder body.

2. The coffee grinder according to claim 1, wherein said actuator comprises a stepper motor.

3. The coffee grinder according to claim 1, wherein said transmission means comprise a worm or pinion and a toothed wheel meshed with said worm or pinion.

4. The coffee grinder according to claim 3, wherein the worm or pinion is integral in rotation with said actuator and the toothed wheel is integral in translation with one of the driven grinder and the fixed grinder.

5. The coffee grinder according to claim 3, wherein between the worm or pinion and the toothed wheel elastic clearance recovery means are placed, to ensure the contact without clearance between the worm or pinion and teeth of the toothed wheel.

6. The coffee grinder according to claim 3, wherein the worm or pinion is coaxial to the actuator and perpendicular to a rotation axis of the driven grinder.

7. The coffee grinder according to claim 1, wherein a mechanical connection between the electric motor and the driven grinder comprises a grooved profile so as to enable a transmission of rotation and a relative translation between them.

8. The coffee grinder according to claim 1, wherein the first encoder comprises a first magnet having a diametrically oriented magnetic field, and a relative first electronic circuit board interfaced with the first magnet provided with sensors such as to read the orientation of the first magnet and recognise the degree of rotation the control knob has undergone.

9. The coffee grinder according to claim 8, wherein the adjustment knob is axially movable relative to the grinder body and the first electronic circuit board comprises a proximity sensor which also recognises the approach in an axial direction of the first magnet integral with the adjustment knob.

10. The coffee grinder according to claim 8, wherein said transmission means comprise a worm or pinion and a toothed wheel meshed with said worm or pinion, and wherein the coffee grinder further comprises a second encoder integral in rotation with the worm or pinion, provided with a relative second control electronic circuit board of the second encoder.

11. The coffee grinder according to claim 10, wherein said second encoder associated with the worm or pinion comprises a second magnet having a diametrically oriented magnetic field, arranged integrally with a guide axis of the worm or pinion and therefore also with the actuator.

12. The coffee grinder according to claim 10, wherein the orientation of the second encoder is detected by a sensor on the second electronic circuit board of the second encoder facing it.

13. The coffee grinder according to claim 10, comprising a first encoder integral in rotation with an adjustment knob outside the grinder body, wherein said second encoder is axially facing the first encoder.

14. The coffee grinder according to claim 1, wherein a limit stop disc fitted with an appendage is fixed to the toothed wheel so as to interfere in abutment with a locking pin integral with the grinder body, so as to identify a 360° limit stop to the rotation of the driven grinder wheel.

15. The coffee grinder according to claim 14, wherein said limit stop disc is provided with at least one slot for the passage of a fixing screw of the limit stop disc on the toothed wheel, to record the angular position of the limit stop disc and the relative appendage.

16. A method for adjusting a coffee grinder according to claim 1, comprising defining a zero closing point of the grinders, corresponding to the minimum opening or distance between the grinders, comprising the steps of:
   with the electric motor off, with grinding chamber and the gap between the grinders free of coffee, with indefinite motion by actuating the stepper motor in a given and known direction of rotation,
   bringing the grinders into mutual contact to define a zero position,
   defining an offset or minimum distance below which it is not possible in normal use to juxtapose the grinders, said offset defining a minimum granule size of the coffee powder obtainable.

17. The adjustment method according to claim 16, comprising the step of storing a multitude of adjustment positions, i.e. relative distances between said grinders, which can be called up by push buttons and/or via a display.

18. The adjustment method according to claim 16, comprising setting a maximum opening point or distance between the grinders, comprising the steps of:
   during assembly in the factory, manually placing in contact a grinder holder of the driven grinder with a grinding chamber, the driven grinder being integral with a screw screwing into a nut to obtain the movement of the driven grinder in the adjustment direction,
   from this position, spacing by a given space the grinder holder and the grinding chamber, said space defining a safety distance,
   in this position, attaching a limit stop disc to the screw so that an appendage of said limit stop disc abuts with a locking pin integral with the grinder body.

19. Coffee grinder comprising:
   a grinder body,
   an electric motor,
   at least one driven grinder operatively connected to said electric motor,
   at least one fixed grinder, operatively separate from the electric motor,
   said driven and fixed grinders having respective teeth mutually facing and spaced from each other with respect to an adjustment direction, wherein at least one of said driven and fixed grinders is movable with respect to the other along said adjustment direction, wherein the coffee grinder further comprises an actuator operatively connected by transmission means to the driven grinder so as to adjust and modify a mutual distance between the teeth thereof along said adjustment direction, and wherein a limit stop disc fitted with an appendage is fixed to the toothed wheel so as to interfere in abutment with a locking pin integral with the grinder body, so as to identify a 360° limit stop to the rotation of the driven grinder wheel.

20. Coffee grinder comprising:

a grinder body, an electric motor, at least one driven grinder operatively connected to said electric motor, at least one fixed grinder, operatively separate from the electric motor, said driven and fixed grinders having respective teeth mutually facing and spaced from each other with respect to an adjustment direction, wherein at least one of said driven and fixed grinders is movable with respect to the other along said adjustment direction, wherein the coffee grinder further comprises:

an actuator operatively connected by transmission means to the driven grinder so as to adjust and modify a mutual distance between the teeth thereof along said adjustment direction, and a first encoder integral in rotation with an adjustment knob outside the grinder body;

wherein the first encoder comprises a first magnet having a diametrically oriented magnetic field and a relative first electronic circuit board interfaced with the first magnet provided with sensors such as to read the orientation of the first magnet and recognise the degree of rotation the control knob has undergone;

wherein said transmission means comprise a worm or pinion and a toothed wheel meshed with said worm or pinion, and wherein the coffee grinder further comprises a second encoder integral in rotation with the worm or pinion, provided with a relative second control electronic circuit board of the second encoder.

* * * * *